United States Patent
Lu et al.

(10) Patent No.: US 10,530,591 B2
(45) Date of Patent: Jan. 7, 2020

(54) METHOD AND DEVICE FOR CONTROLLING BINDING OF DATA FLOW TO BEARER

(71) Applicant: Huawei Technologies Co., Ltd., Shenzhen (CN)

(72) Inventors: Wei Lu, Shanghai (CN); Mirko Schramm, Berlin (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 15/593,552

(22) Filed: May 12, 2017

(65) Prior Publication Data
US 2017/0250829 A1    Aug. 31, 2017

Related U.S. Application Data

(63) Continuation of application No. PCT/CN2014/090940, filed on Nov. 12, 2014.

(51) Int. Cl.
H04L 12/14    (2006.01)
H04W 28/18    (2009.01)
(Continued)

(52) U.S. Cl.
CPC ...... *H04L 12/1407* (2013.01); *H04L 41/0893* (2013.01); *H04L 47/2433* (2013.01);
(Continued)

(58) Field of Classification Search
CPC . H04L 12/14; H04L 12/1407; H04L 47/2433; H04L 41/0893; H04W 28/02;
(Continued)

(56) References Cited

U.S. PATENT DOCUMENTS

2010/0017846 A1*  1/2010  Huang .................... H04L 12/14
                                                        726/1
2011/0317718 A1* 12/2011  Siddam ............... H04L 12/1407
                                                        370/468
(Continued)

FOREIGN PATENT DOCUMENTS

CN    101222413 A    7/2008
CN    102217341 A    10/2011
(Continued)

OTHER PUBLICATIONS

"3rd Generation Partnership Project; Technical Specification Group Services and System Aspects; Policy and charging control architecture (Release 12)," 3GPP TS 23.203 v12.6.0, Sep. 2014, 220 pages.
(Continued)

*Primary Examiner* — Kyaw Z Soe
(74) *Attorney, Agent, or Firm* — Slater Matsil, LLP

(57) ABSTRACT

The present embodiments disclose a method and a device for controlling binding of a data flow to a bearer. The method includes receiving, by a policy and charging enforcement function (PCEF) device, indication information and an identifier of a policy and charging control (PCC) rule from a policy and charging rules function (PCRF) device and binding, by the PCEF device to a target bearer according to the indication information, a data flow indicated by an identifier of the data flow in the PCC rule indicated by the identifier of the PCC rule.

14 Claims, 5 Drawing Sheets

A policy and charging rules function PCRF device generates indication information, where the indication information includes a target QoS parameter, service information, or an identifier of a target bearer — 201

The PCRF device sends an identifier of a PCC rule and the indication information to a policy and charging enforcement function PCEF device, so that the PCEF device binds, to the target bearer according to the indication information, a data flow indicated by an identifier of the data flow in the PCC rule indicated by the identifier of the PCC rule — 202

(51) Int. Cl.
*H04W 28/02* (2009.01)
*H04L 12/851* (2013.01)
*H04L 12/24* (2006.01)
*H04W 76/12* (2018.01)

(52) U.S. Cl.
CPC ....... *H04W 28/0268* (2013.01); *H04W 28/18* (2013.01); *H04W 76/12* (2018.02)

(58) Field of Classification Search
CPC .. H04W 28/18; H04W 28/0268; H04W 72/04
See application file for complete search history.

(56) References Cited

U.S. PATENT DOCUMENTS

2014/0153391 A1* 6/2014 Ludwig ............... H04L 41/0816
370/230

2015/0131436 A1* 5/2015 Backman .......... H04W 28/0268
370/230

FOREIGN PATENT DOCUMENTS

CN 104010332 A 8/2014
EP 2093931 A1 8/2009

OTHER PUBLICATIONS

"3rd Generation Partnership Project; Technical Specification Group Core Network and Terminals; Policy and Charging Control signalling flows and Quality of Service (QoS) parameter mapping (Release 12)," 3GPP TS 29.213 v12.1.0, Sep. 2013, 200 pages.

"3rd Generation Partnership Project; Technical Specification Group Core Network and Terminals; Policy and Charging Control (PCC); Reference points (Release 12)," 3GPP TS 29.212 V12.1.0 (Jun. 2013), 200 pages.

* cited by examiner

METHOD AND DEVICE FOR CONTROLLING BINDING OF DATA FLOW TO BEARER

CROSS-REFERENCE TO RELATED APPLICATIONS

This application is a continuation of International Application No. PCT/CN2014/090940, filed on Nov. 12, 2014, the disclosure of which is hereby incorporated by reference in its entirety.

TECHNICAL FIELD

Embodiments of the present invention relate to the communications field, and more specifically, to a method and a device for controlling binding of a data flow to a bearer.

BACKGROUND

A policy and charging rules function (PCRF) device generates and authorizes a policy and charging control (PCC) rule for a data flow according to factors such as an operator policy, user network access constraints, user subscription data, and service information of a data flow of an application service that is currently being performed by the user, and the PCC rule usually includes a data flow identifier (flow template) and QoS (Quality of Service) information corresponding to a data flow corresponding to the data flow identifier. After generating the PCC rule, the PCRF device installs the PCC rule on a policy and charging enforcement function (PCEF) device. The PCEF device binds the data flow to a bearer according to quality of service in the PCC rule, and this type of PCC rule is referred to as a dynamic rule. In addition, there is another type of PCC rule referred to as a non-dynamic rule (also referred to as a predefined PCC rule), the PCRF knows authorized QoS information and identifier of authorized rule, and the PCRF can activate this type of rule. The PCRF adds the identifier of the rule to an activation message sent to the PCEF device, but the PCRF cannot change the QoS information in the rule.

Generally, one bearer includes one or more service data flows. The PCEF needs to perform an operation for binding the data flow to a bearer according to a PCC rule, that is, to determine a bearer at which the service data flow is located. A basic binding rule is to bind service data flows whose QoS parameters (QoS class identifier (QCI)/allocation and retention priority (ARP)) in the PCC rule are the same to a same bearer. Otherwise, service data flows corresponding to different QoS parameters cannot be bound to a same bearer.

In this way, when a data flow corresponding to a dynamic PCC rule and a data flow corresponding to a non-dynamic PCC rule are bound to a same bearer, if the PCRF performs an operation for changing a QoS parameter (QCI/ARP) on the dynamic PCC rule, a changed QoS parameter is different from the original QoS parameter. Therefore, the QoS parameter in the dynamic PCC rule is different from that in the non-dynamic PCC rule. In this way, two data flows that separately correspond to the original dynamic PCC rule and the non-dynamic PCC rule need to be bound to two different bearers. In this case, a quantity of bearers in a system is increased.

However, in some cases, the PCRF may temporarily change the QoS parameter in the dynamic PCC rule or a QoS parameter of a default bearer, and after a period of time, a current QoS parameter may be restored to the original QoS parameter. For example, in a service that provides prior access to a network for some government officials or emergency management officials when a natural disaster such as an earthquake causes network congestion, the system improves QoS of a bearer of a specific user according to a priority of the user, and further provides a high-priority service for the user. In this case, an increment of the quantity of bearers in the system because of a change of QoS in the dynamic PCC rule is unnecessary. In the transient process, bearers are increased in the system, and system maintenance costs are increased.

SUMMARY

Embodiments of the present invention provide a method and a device for controlling binding of a data flow to a bearer, so as to decrease system maintenance costs.

According to a first aspect, an embodiment of the present invention provides a method for controlling binding of a data flow to a bearer, including: receiving, by a policy and charging enforcement function (PCEF) device, indication information and an identifier of a policy and charging control (PCC) rule from a policy and charging rules function (PCRF) device; and binding, by the PCEF device to a target bearer according to the indication information, a data flow indicated by an identifier of the data flow in the PCC rule indicated by the identifier of the PCC rule.

With reference to the first aspect, in a first implementation manner of the first aspect, the indication information includes a target quality of service (QoS) parameter, service information, or an identifier of the target bearer.

With reference to the first aspect and the foregoing implementation manner, in a second implementation manner of the first aspect, the binding, by the PCEF device to a target bearer according to the indication information, a data flow indicated by an identifier of the data flow in the PCC rule indicated by the identifier of the PCC rule includes: changing, by the PCEF device, a QoS parameter in the PCC rule corresponding to the identifier of the PCC rule to the target QoS parameter in the indication information; and binding, by the PCEF device to the target bearer according to a changed PCC rule, the data flow indicated by the identifier of the data flow in the PCC rule indicated by the identifier of the PCC rule.

With reference to the first aspect and the foregoing implementation manner, in a third implementation manner of the first aspect, the binding, by the PCEF device to a target bearer according to the indication information, a data flow indicated by an identifier of the data flow in the PCC rule indicated by the identifier of the PCC rule includes: changing, by the PCEF device, a QoS parameter in the PCC rule corresponding to the identifier of the PCC rule to a QoS parameter corresponding to the service information in the indication information; and binding, by the PCEF device to the target bearer according to a changed PCC rule, the data flow indicated by the identifier of the data flow in the PCC rule indicated by the identifier of the PCC rule.

With reference to the first aspect and the foregoing implementation manner, in a fourth implementation manner of the first aspect, the binding, by the PCEF device to a target bearer according to the indication information, a data flow indicated by an identifier of the data flow in the PCC rule indicated by the identifier of the PCC rule includes: binding, by the PCEF device, the data flow indicated by the identifier of the data flow in the PCC rule indicated by the identifier of the PCC rule to the bearer corresponding to the identifier of the target bearer in the indication information.

With reference to the first aspect and the foregoing implementation manner, in a fifth implementation manner of the first aspect, the identifier of the target bearer includes an identifier of a default bearer.

According to a second aspect, an embodiment of the present invention provides a method for controlling binding of a data flow to a bearer, including: generating, by a PCRF device, indication information, where the indication information includes a target QoS parameter, service information, or an identifier of a target bearer; and sending, by the PCRF device, an identifier of a PCC rule and the indication information to a PCEF device, so that the PCEF device binds, to the target bearer according to the indication information, a data flow indicated by an identifier of the data flow in the PCC rule indicated by the identifier of the PCC rule.

With reference to the second aspect, in a first implementation manner of the second aspect, the identifier of the PCC rule includes an identifier of a predefined PCC rule.

According to a third aspect, an embodiment of the present invention provides a method for controlling binding of a data flow to a bearer, including: receiving, by a PCEF device from a PCRF device, indication information for changing a QoS parameter of a default bearer; and if there is a data flow corresponding to a predefined PCC rule in the default bearer before the QoS parameter of the default bearer is changed, binding, by the PCEF device to the default bearer, the data flow corresponding to the predefined PCC rule.

With reference to the third aspect, in a first implementation manner of the third aspect, the binding, by the PCEF device to the default bearer, the data flow corresponding to the predefined PCC rule includes: when the PCEF device determines that a changed QoS parameter of the default bearer belongs to a specific QoS parameter range, binding, by the PCEF device to the default bearer, the data flow corresponding to the predefined PCC rule.

According to a fourth aspect, an embodiment of the present invention provides a policy and charging enforcement function device, including: a receiving unit, configured to receive indication information and an identifier of a PCC rule from a PCRF device; and a processing unit, configured to bind, to a target bearer according to the indication information, a data flow indicated by an identifier of the data flow in the PCC rule indicated by the identifier of the PCC rule.

With reference to the fourth aspect, in a first implementation manner of the fourth aspect, the indication information includes a target QoS parameter, service information, or an identifier of the target bearer.

With reference to the fourth aspect and the foregoing implementation manner, in a second implementation manner of the fourth aspect, the processing unit is specifically configured to: change a QoS parameter in the PCC rule corresponding to the identifier of the PCC rule to the target QoS parameter in the indication information; and bind, to the target bearer according to a changed PCC rule, the data flow indicated by the identifier of the data flow in the PCC rule indicated by the identifier of the PCC rule.

With reference to the fourth aspect and the foregoing implementation manner, in a third implementation manner of the fourth aspect, the processing unit is specifically configured to: change a QoS parameter in the PCC rule corresponding to the identifier of the PCC rule to a QoS parameter corresponding to the service information in the indication information; and bind, to the target bearer according to a changed PCC rule, the data flow indicated by the identifier of the data flow in the PCC rule indicated by the identifier of the PCC rule.

With reference to the fourth aspect and the foregoing implementation manner, in a fourth implementation manner of the fourth aspect, the processing unit is specifically configured to bind the data flow indicated by the identifier of the data flow in the PCC rule indicated by the identifier of the PCC rule to the bearer corresponding to the identifier of the target bearer in the indication information.

With reference to the fourth aspect and the foregoing implementation manner, in a fifth implementation manner of the fourth aspect, the identifier of the target bearer includes an identifier of a default bearer.

According to a fifth aspect, an embodiment of the present invention provides a policy and charging rules function device, including: a generation unit, configured to generate indication information, where the indication information includes a target QoS parameter, service information, or an identifier of a target bearer; and a sending unit, configured to send an identifier of a PCC rule and the indication information to a PCEF device, so that the PCEF device binds, to the target bearer according to the indication information, a data flow indicated by an identifier of the data flow in the PCC rule indicated by the identifier of the PCC rule.

With reference to the fifth aspect, in a first implementation manner of the fifth aspect, the identifier of the PCC rule includes an identifier of a predefined PCC rule.

According to a sixth aspect, an embodiment of the present invention provides a policy and charging enforcement function device, including: a receiving unit, configured to receive, from a PCRF device, indication information for changing a QoS parameter of a default bearer; and a processing unit, configured to: if there is a data flow corresponding to a predefined PCC rule in the default bearer before the QoS parameter of the default bearer is changed, bind the data flow corresponding to the predefined PCC rule to the default bearer.

With reference to the sixth aspect, in a first implementation manner of the sixth aspect, the processing unit is specifically configured to: when the PCEF device determines that a changed QoS parameter of the default bearer belongs to a specific QoS parameter range, bind the data flow corresponding to the predefined PCC rule to the default bearer.

In the method according to the embodiments of the present invention, when a QoS parameter of a dynamic PCC rule is changed, a PCRF device sends indication information and an identifier of the PCC rule to a PCEF device. Then, the PCEF device performs, according to the indication information, bearer binding of a data flow corresponding to the identifier of the PCC rule. In this way, a case in which a new bearer is added can be avoided, and system maintenance costs can be further decreased.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present embodiments.

It should be understood that, the technical solutions of the embodiments of the present invention may be applied to various communications systems, such as: a Global System for Mobile Communications (GSM for short) system, a Code Division Multiple Access (CDMA for short) system, a Wideband Code Division Multiple Access (WCDMA for short) system, a general packet radio service (GPRS for short), a Long Term Evolution (ELTE for short) system, an LTE frequency division duplex (FDD for short) system, an LTE time division duplex (TDD for short), a Universal Mobile Telecommunications System (UMTS for short), a Worldwide Interoperability for Microwave Access (WiMAX for short) communications system or the like.

Figure 1:
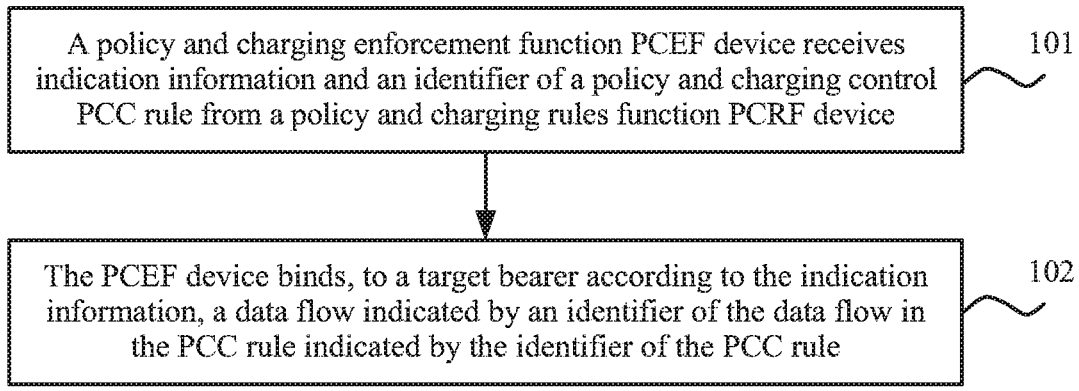
FIG. 1 is a schematic flowchart of a method for controlling binding of a data flow to a bearer according to an embodiment of the present invention.

FIG. 1 is a schematic flowchart of a method for controlling binding of a data flow to a bearer according to an embodiment of the present invention. The method in FIG. 1 may be performed by a PCEF device.

101. The policy and charging enforcement function (PCEF) device receives indication information and an identifier of a policy and charging control (PCC) rule from a policy and charging rules function (PCRF) device.

For example, the PCEF device receives a re-authentication request (RAR) message from the PCRF device, and the RAR message carries the indication information and the identifier of the PCC rule. It should be understood that, the RAR message is only one implementation manner of embodiments of the present invention, and an implementation manner for implementing the embodiments of the present invention by using another message to carry the indication information and the identifier of the PCC rule shall fall within the protection scope of the embodiments of the present invention.

102. The PCEF device binds, to a target bearer according to the indication information, a data flow indicated by an identifier of the data flow in the PCC rule indicated by the identifier of the PCC rule.

For example, when binding, to the target bearer, the data flow indicated by the identifier of the data flow in the PCC rule corresponding to the identifier of the PCC rule, the PCEF device performs bearer binding according to the indication information, instead of performing bearer binding by using the PCC rule directly according to a bearer binding rule.

In the method according to this embodiment of the present invention, when a QoS parameter of a dynamic PCC rule is changed, a PCRF device sends indication information and an identifier of the PCC rule to a PCEF device. Then, the PCEF device performs, according to the indication information, bearer binding of a data flow indicated by an identifier of the data flow in the PCC rule indicated by the identifier of the PCC rule. In this way, a case in which a new bearer is added can be avoided, and system maintenance costs can be further decreased.

Optionally, in one embodiment, the indication information includes a target QoS parameter, service information, or an identifier of the target bearer. For example, the service information may be priority service information.

Optionally, in another embodiment, when binding, to the target bearer according to the indication information, the data flow indicated by the identifier of the data flow in the PCC rule indicated by the identifier of the PCC rule, the PCEF device first changes a QoS parameter in the PCC rule corresponding to the identifier of the PCC rule to the target QoS parameter in the indication information. In this case, the PCEF device binds, to the target bearer according to a changed PCC rule, the data flow indicated by the identifier of the data flow in the PCC rule indicated by the identifier of the PCC rule.

For example, the indication information includes the target QoS parameter. After receiving the indication information, the PCEF device first changes a QoS parameter of a corresponding PCC rule to the target QoS parameter; and then binds, to a bearer that has a same QoS (QoS class identifier (QCI)/allocation and retention priority (ARP)) parameter according to a changed PCC rule, the data flow indicated by the identifier of the data flow in the PCC rule indicated by the identifier of the PCC rule.

Optionally, in another embodiment, when the PCEF device binds, to the target bearer according to the indication information, the data flow corresponding to the identifier of the PCC rule, the PCEF device changes a QoS parameter in the PCC rule indicated by the identifier of the PCC rule to a QoS parameter corresponding to the service information in the indication information. Then, the PCEF device binds, to the target bearer according to a changed PCC rule, the data flow corresponding to the identifier of the PCC rule.

For example, the indication information includes the service information. After receiving the indication information, the PCEF device first changes a QoS parameter of a corresponding PCC rule to the QoS parameter corresponding to the service information; and then binds, to a bearer that has a same QoS (QCI/ARP) parameter according to a changed PCC rule, the data flow indicated by the identifier of the data flow in the PCC rule indicated by the identifier of the PCC rule.

Optionally, in another embodiment, when the PCEF device binds, to the target bearer according to the indication information, the data flow indicated by the identifier of the data flow in the PCC rule indicated by the identifier of the PCC rule, the PCEF device binds the data flow corresponding to the identifier of the PCC rule to the bearer corresponding to the identifier of the target bearer in the indication information.

For example, the indication information includes the identifier of the target bearer. After receiving the indication information, the PCEF device directly binds, to the target bearer, the data flow indicated by the identifier of the data flow in the PCC rule indicated by the identifier of the PCC rule, without changing the QoS parameter of the PCC rule.

Optionally, in another embodiment, the identifier of the target bearer includes an identifier of a default bearer.

There are two types of bearers in a system: the default bearer and a dedicated bearer. The default bearer is the first bearer when a user establishes a public data network (PDN) connection. The dedicated bearer is another bearer different from the default bearer. The default bearer always exists during the PDN connection, and after the default bearer is deactivated, the PDN connection is also deactivated at the same time. If there is only one PDN connection in the system, after the PDN connection is deactivated, the user is detached.

Therefore, the PCEF device directly binds the data flow corresponding to the identifier of the PCC rule to the default bearer, so as to avoid adding a new bearer.

Figure 2:
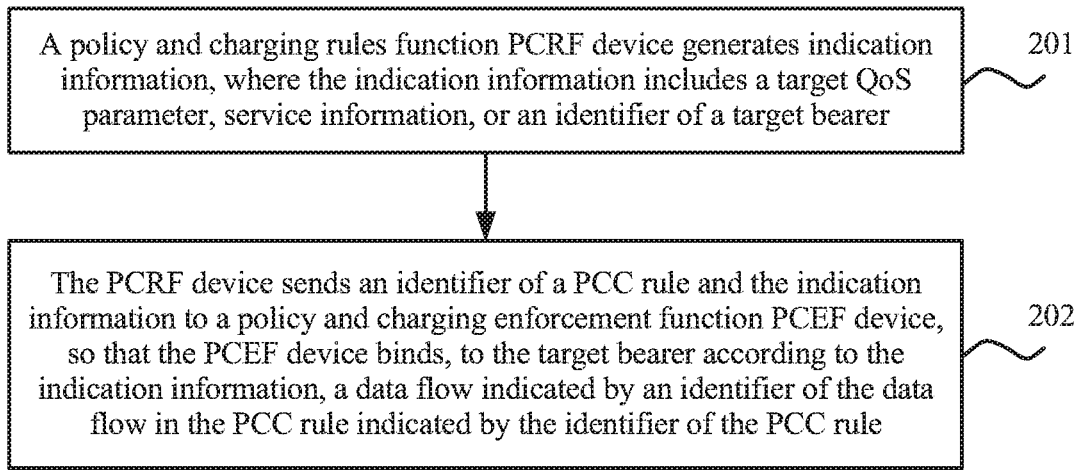
FIG. 2 is a schematic flowchart of a method for controlling binding of a data flow to a bearer according to another embodiment of the present invention.

FIG. 2 is a schematic flowchart of a method for controlling binding of a data flow to a bearer according to another embodiment of the present invention. The method in FIG. 2 may be performed by a PCRF device.

201. The PCRF device generates indication information, where the indication information includes a target QoS parameter, service information, or an identifier of a target bearer.

For example, when a QoS parameter of a dynamic PCC rule is changed, the PCRF device generates indication information according to a changed dynamic PCC rule, so as to instruct bearer binding of a data flow corresponding to a predefined PCC rule whose QoS parameter is the same as that of the dynamic PCC rule before the change. The service information may be priority service information.

For another example, the changed QoS parameter of the dynamic PCC rule is used as the target QoS parameter, and a PCEF device is instructed to change the QoS parameter of the corresponding predefined PCC rule to the target QoS parameter. Alternatively, if a priority service causes the change of the QoS parameter of the dynamic PCC rule, the service information (for example, an identifier of the priority service or corresponding QoS parameter information) is directly used as the indication information. Alternatively, a bearer identifier corresponding to the changed dynamic PCC rule is directly used as the identifier of the target bearer, and the PCEF device is instructed to directly bind the data flow to the target bearer.

202. The PCRF device sends an identifier of a PCC rule and the indication information to a PCEF device, so that the PCEF device binds, to the target bearer according to the indication information, a data flow indicated by an identifier of the data flow in the PCC rule indicated by the identifier of the PCC rule.

For example, the PCRF device sends an RAR message to the PCEF device, and the RAR message carries the indication information and the identifier of the PCC rule. It should be understood that, the RAR message is only one implementation manner of embodiments of the present invention, and an implementation manner for implementing the embodiments of the present invention by using another message to carry the indication information and the identifier of the PCC rule shall fall within the protection scope of the embodiments of the present invention.

In the method according to this embodiment of the present invention, when a QoS parameter of a dynamic PCC rule is changed, a PCRF device sends indication information and an identifier of the PCC rule to a PCEF device. Then, the PCEF device performs, according to the indication information, bearer binding of a data flow corresponding to the identifier of the PCC rule. In this way, a case in which a new bearer is added can be avoided, and system maintenance costs can be further decreased.

Optionally, in one embodiment, the identifier of the PCC rule includes an identifier of a predefined PCC rule.

Figure 3:
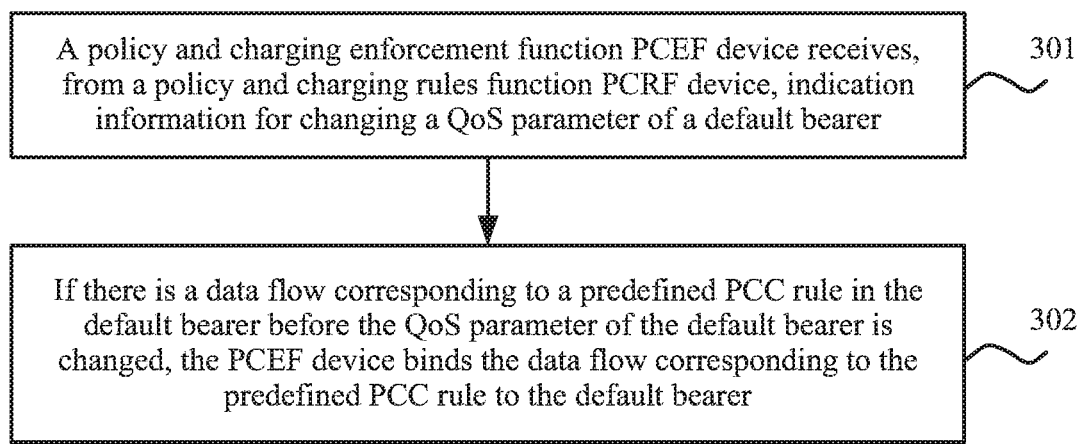
FIG. 3 is a schematic flowchart of a method for controlling binding of a data flow to a bearer according to another embodiment of the present invention.

FIG. 3 is a schematic flowchart of a method for controlling binding of a data flow to a bearer according to another embodiment of the present invention. The method in FIG. 3 may be performed by a PCEF device.

301. The PCEF device receives, from a PCRF device, indication information for changing a QoS parameter of a default bearer.

302. If there is a data flow (for example, in the default bearer, there is one or more data flows that use a predefined PCC rule) corresponding to the predefined PCC rule in the default bearer before the QoS parameter of the default bearer is changed, the PCEF device binds the data flow corresponding to the predefined PCC rule to the default bearer.

For example, if there is a data flow corresponding to the predefined PCC rule in the default bearer before the QoS parameter of the default bearer is changed, when the data flow corresponding to the predefined PCC rule is subsequently bound, the data flow is still bound to the default bearer, instead of a new bearer established for the data flow.

Optionally, the PCEF may notify the PCRF of a QoS parameter in a PCC rule indicated by an identifier of the current PCC rule, and/or identifier information of a bearer in which a data flow is located, where the data flow is indicated by an identifier of the data flow in the PCC rule indicated by the identifier of the PCC rule. For example, the identifier of the PCC rule and/or a bearer identifier and/or QoS parameter information or the like is included in a re-authentication answer message.

In the method according to this embodiment of the present invention, when a QoS parameter of a default bearer is changed, a PCEF device still binds a data flow corresponding to a predefined PCC rule to the default bearer. In this way, a case in which a new bearer is added can be avoided, and system maintenance costs can be further decreased.

Optionally, in one embodiment, when binding the data flow corresponding to the predefined PCC rule to the default bearer, the PCEF device first determines whether a changed QoS parameter of the default bearer belongs to a preset specific parameter range.

When the PCEF device determines that the changed QoS parameter of the default bearer belongs to the specific QoS parameter range, the PCEF device binds the data flow corresponding to the predefined PCC rule to the default bearer.

Figure 4:
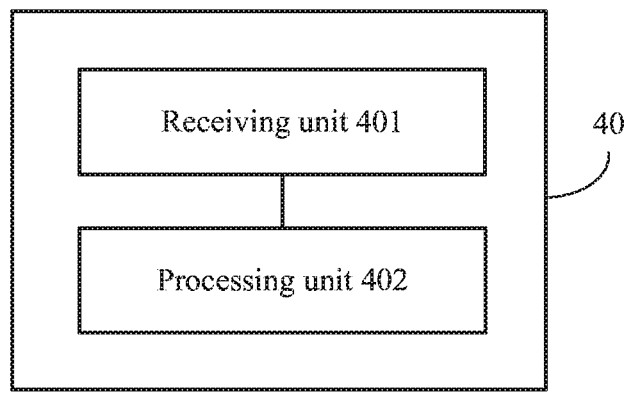
FIG. 4 is a schematic block diagram of a policy and charging enforcement function device according to an embodiment of the present invention.

FIG. 4 is a schematic block diagram of a policy and charging enforcement function device according to an embodiment of the present invention. A PCEF device 40 includes a receiving unit 401 and a processing unit 402.

The receiving unit 401 is configured to receive indication information and an identifier of a PCC rule from a PCRF device.

For example, the PCEF device receives an RAR message from the PCRF device, and the RAR message carries the indication information and the identifier of the PCC rule. It should be understood that, the RAR message is only one implementation manner of embodiments of the present invention, and an implementation manner for implementing the embodiments of the present invention by using another message to carry the indication information and the identifier of the PCC rule shall fall within the protection scope of the embodiments of the present invention.

The processing unit 402 is configured to bind, to a target bearer according to the indication information, a data flow indicated by an identifier of the data flow in the PCC rule indicated by the identifier of the PCC rule.

For example, when binding, to the target bearer, the data flow indicated by the identifier of the data flow in the PCC rule corresponding to the identifier of the PCC rule, the PCEF device performs bearer binding according to the indication information, instead of performing bearer binding by using the PCC rule directly according to a bearer binding rule.

In the method according to this embodiment of the present invention, when a QoS parameter of a dynamic PCC rule is changed, a PCRF device sends indication information and an identifier of the PCC rule to a PCEF device. Then, the PCEF device performs, according to the indication information, bearer binding of a data flow corresponding to the identifier of the PCC rule. In this way, a case in which a new bearer is added can be avoided, and system maintenance costs can be further decreased.

Optionally, in one embodiment, the indication information includes a target QoS parameter, service information, or an identifier of the target bearer. For example, the service information may be priority service information.

Optionally, in another embodiment, the processing unit 402 is specifically configured to: change a QoS parameter in the PCC rule corresponding to the identifier of the PCC rule to the target QoS parameter in the indication information; and bind, to the target bearer according to a changed PCC rule, the data flow indicated by the identifier of the data flow in the PCC rule indicated by the identifier of the PCC rule.

For example, the indication information includes the target QoS parameter. After receiving the indication information, the PCEF device first changes a QoS parameter of a corresponding PCC rule to the target QoS parameter; and then binds, to a bearer that has a same QoS (QCI/ARP) parameter according to a changed PCC rule, the data flow indicated by the identifier of the data flow in the PCC rule indicated by the identifier of the PCC rule.

Optionally, in another embodiment, the processing unit 402 is specifically configured to: change a QoS parameter in the PCC rule corresponding to the identifier of the PCC rule to a QoS parameter corresponding to the service information in the indication information; and bind, to the target bearer according to a changed PCC rule, the data flow indicated by the identifier of the data flow in the PCC rule indicated by the identifier of the PCC rule.

For example, the indication information includes the service information. After receiving the indication information, the PCEF device first changes a QoS parameter of a corresponding PCC rule to the QoS parameter corresponding to the service information; and then binds, to a bearer that has a same QoS (QCI\ARP) parameter according to a changed PCC rule, the data flow indicated by the identifier of the data flow in the PCC rule indicated by the identifier of the PCC rule.

Optionally, in another embodiment, the processing unit 402 is specifically configured to bind the data flow indicated by the identifier of the data flow in the PCC rule indicated by the identifier of the PCC rule to the bearer corresponding to the identifier of the target bearer in the indication information.

For example, the indication information includes the identifier of the target bearer. After receiving the indication information, the PCEF device directly binds, to the target bearer, the data flow indicated by the identifier of the data flow in the PCC rule indicated by the identifier of the PCC rule, without changing the QoS parameter of the PCC rule.

Optionally, in another embodiment, the identifier of the target bearer includes an identifier of a default bearer.

There are two types of bearers in a system: the default bearer and a dedicated bearer. The default bearer is the first bearer when a user establishes a PDN connection. The dedicated bearer is another bearer different from the default bearer. The default bearer always exists during the PDN connection, and after the default bearer is deactivated, the PDN connection is also deactivated at the same time. If there is only one PDN connection in the system, after the PDN connection is deactivated, the user is detached.

Therefore, the PCEF device directly binds the data flow corresponding to the identifier of the PCC rule to the default bearer, so as to avoid adding a new bearer.

Figure 5:
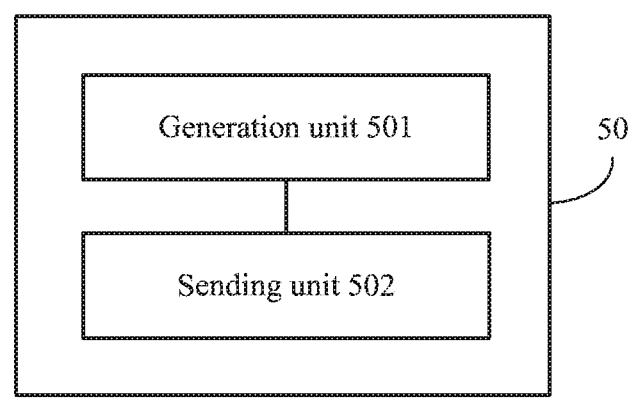
FIG. 5 is a schematic block diagram of a policy and charging rules function device according to an embodiment of the present invention.

FIG. 5 is a schematic block diagram of a policy and charging rules function device according to an embodiment of the present invention. A PCRF device 50 includes a generation unit 501 and a sending unit 502.

The generation unit 501 is configured to generate indication information, where the indication information includes a target QoS parameter, service information, or an identifier of a target bearer.

For example, when a QoS parameter of a dynamic PCC rule is changed, the PCRF device generates indication information according to a changed dynamic rule, so as to instruct bearer binding of a data flow corresponding to a predefined PCC rule whose QoS parameter is the same as that of the dynamic PCC rule before the change.

For another example, the changed QoS parameter of the dynamic PCC rule is used as the target QoS parameter, and a PCEF device is instructed to change the QoS parameter of the corresponding predefined PCC rule to the target QoS parameter. Alternatively, if a priority service causes the change of the QoS parameter of the dynamic PCC rule, the service information (for example, an identifier of the priority service or corresponding QoS parameter information) is directly used as the indication information. Alternatively, a bearer identifier corresponding to the changed dynamic PCC rule is directly used as the identifier of the target bearer, and the PCEF device is instructed to directly bind the data flow to the target bearer.

The sending unit 502 is configured to send an identifier of a PCC rule and the indication information to the PCEF device, so that the PCEF device binds, to the target bearer according to the indication information, a data flow indicated by an identifier of the data flow in the PCC rule indicated by the identifier of the PCC rule.

For example, the PCRF device sends an RAR message to the PCEF device, and the RAR message carries the indication information and the identifier of the PCC rule. It should be understood that, the RAR message is only one implementation manner of embodiments of the present invention, and an implementation manner for implementing the embodiments of the present invention by using another message to carry the indication information and the identifier of the PCC rule shall fall within the protection scope of the embodiments of the present invention.

In the method according to this embodiment of the present invention, when a QoS parameter of a dynamic PCC rule is changed, a PCRF device sends indication information and an identifier of the PCC rule to a PCEF device. Then, the PCEF device performs, according to the indication information, bearer binding of a data flow corresponding to the identifier of the PCC rule. In this way, a case in which a new bearer is added can be avoided, and system maintenance costs can be further decreased.

Optionally, in one embodiment, the identifier of the PCC rule includes an identifier of a predefined PCC rule.

Figure 6:
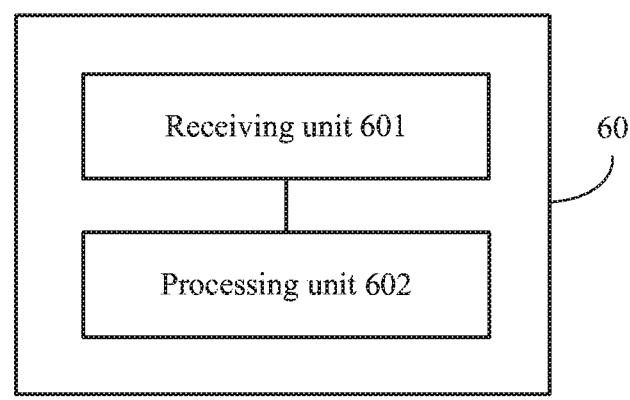
FIG. 6 is a schematic block diagram of a policy and charging enforcement function device according to another embodiment of the present invention.

FIG. 6 is a schematic block diagram of a policy and charging enforcement function device according to another embodiment of the present invention. A PCEF device 60 includes a receiving unit 601 and a processing unit 602.

The receiving unit 601 is configured to receive, from a PCRF device, indication information for changing a QoS parameter of a default bearer.

The processing unit 602 is configured to: if there is a data flow (for example, in the default bearer, there is one or more data flows that use a predefined PCC rule) corresponding to the predefined PCC rule in the default bearer before the QoS parameter of the default bearer is changed, bind the data flow corresponding to the predefined PCC rule to the default bearer.

For example, if there is a data flow corresponding to the predefined PCC rule in the default bearer before the QoS parameter of the default bearer is changed, when subsequently binding the data flow corresponding to the predefined PCC rule, the processing unit 602 still binds the data flow to the default bearer, instead of a new bearer established for the data flow.

Optionally, the PCEF may notify the PCRF of a QoS parameter in a PCC rule indicated by an identifier of the current PCC rule, and/or identifier information of a bearer in which a data flow is located, where the data flow is indicated by an identifier of the data flow in the PCC rule indicated by the identifier of the PCC rule. For example, the identifier of the PCC rule and/or a bearer identifier and/or QoS parameter information or the like is included in a re-authentication answer message.

In the method according to this embodiment of the present invention, when a QoS parameter of a default bearer is temporarily changed, a processing unit 602 still binds a data flow corresponding to a predefined PCC rule to the default bearer. In this way, a case in which a new bearer is added can be avoided, and system maintenance costs can be further decreased.

Optionally, in one embodiment, the processing unit 602 is specifically configured to: when the PCEF device determines that a changed QoS parameter of the default bearer belongs to a specific QoS parameter range, bind the data flow corresponding to the predefined PCC rule to the default bearer.

For example, when binding the data flow corresponding to the predefined PCC rule to the default bearer, the PCEF device first determines whether the changed QoS parameter of the default bearer belongs to a preset specific parameter range. When the PCEF device determines that the changed QoS parameter of the default bearer belongs to the specific QoS parameter range, the processing unit 602 binds the data flow corresponding to the predefined PCC rule to the default bearer.

Figure 7:
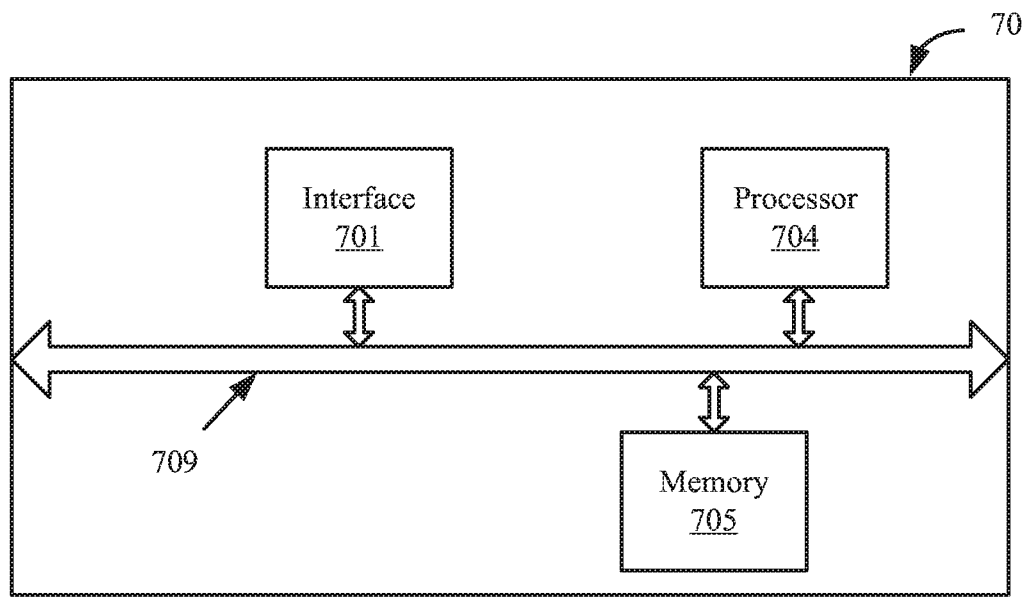
FIG. 7 is a schematic block diagram of a policy and charging enforcement function device according to another embodiment of the present invention.

FIG. 7 is a schematic block diagram of a policy and charging enforcement function according to another embodiment of the present invention.

A policy and charging enforcement function device 70 in FIG. 7 may be configured to implement steps and methods in the foregoing method embodiments. In this embodiment of FIG. 7, the policy and charging enforcement function device 70 includes a processor 704, a memory 705, and an interface 701. The processor 704 controls an operation of the device 70, and may be configured to process a signal. The processor 704 may be referred to as a CPU (Central Processing Unit). The memory 705 may include a read-only memory and a random access memory, and provide an instruction and data for the processor 704. A part of the memory 705 may further include a nonvolatile random access memory (NVRAM). A transmitter circuit 702 and a receiver circuit 703 may be coupled to the interface 701. Components of the policy and charging enforcement function device 70 are coupled together by using a bus system 709, and in addition to a data bus, the bus system 709 includes a power bus, a control bus, and a status signal bus. However, for clarity of description, various buses are marked as the bus system 709 in the figure.

Specifically, the memory 705 may store an instruction for enabling the processor 704 to perform the following operations: receiving indication information and an identifier of a PCC rule from a PCRF device; and binding, to a target bearer according to the indication information, a data flow indicated by an identifier of the data flow in the PCC rule indicated by the identifier of the PCC rule.

In the method according to this embodiment of the present invention, when a QoS parameter of a dynamic PCC rule is changed, a PCRF device sends indication information and an identifier of the PCC rule to a PCEF device. Then, the PCEF device performs, according to the indication information, bearer binding of a data flow corresponding to the identifier of the PCC rule. In this way, a case in which a new bearer is added can be avoided, and system maintenance costs can be further decreased.

Optionally, in one embodiment, the memory 705 may further store an instruction for enabling the processor 704 to perform the following operation.

Generating indication information, where the indication information includes a target QoS parameter, service information, or an identifier of the target bearer.

Optionally, in another embodiment, the memory 705 may further store an instruction for enabling the processor 704 to perform the following operations: when the data flow indicated by the identifier of the data flow in the PCC rule indicated by the identifier of the PCC rule is bound to the target bearer according to the indication information, changing a QoS parameter in the PCC rule corresponding to the identifier of the PCC rule to the target QoS parameter in the indication information; and binding, to the target bearer according to a changed PCC rule, the data flow indicated by the identifier of the data flow in the PCC rule indicated by the identifier of the PCC rule.

Optionally, in another embodiment, the memory 705 may further store an instruction for enabling the processor 704 to perform the following operations: when the data flow indicated by the identifier of the data flow in the PCC rule indicated by the identifier of the PCC rule is bound to the target bearer according to the indication information, changing a QoS parameter in the PCC rule corresponding to the identifier of the PCC rule to a QoS parameter corresponding to service information in the indication information; and binding, to the target bearer according to a changed PCC rule, the data flow indicated by the identifier of the data flow in the PCC rule indicated by the identifier of the PCC rule.

Optionally, in another embodiment, the memory 705 may further store an instruction for enabling the processor 704 to perform the following operation: when the data flow indicated by the identifier of the data flow in the PCC rule indicated by the identifier of the PCC rule is bound to the target bearer according to the indication information, binding the data flow indicated by the identifier of the data flow in the PCC rule indicated by the identifier of the PCC rule to the bearer corresponding to the identifier of the target bearer in the indication information.

Optionally, in another embodiment, the memory 705 may further store an instruction for enabling the processor 704 to perform the following operation.

The identifier of the target bearer includes an identifier of a default bearer.

Figure 8:
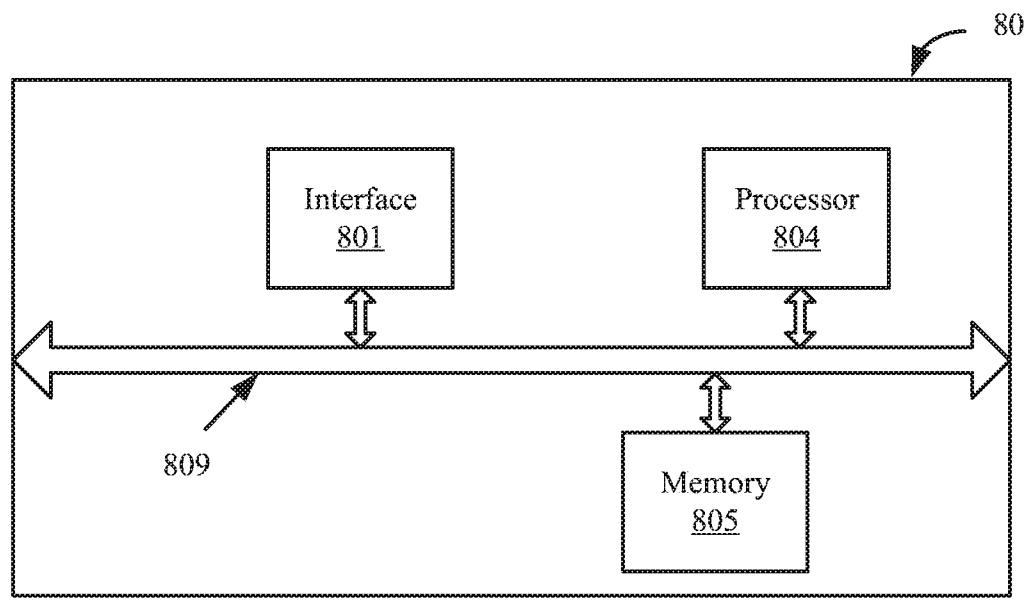
FIG. 8 is a schematic block diagram of a policy and charging rules function device according to another embodiment of the present invention.

FIG. 8 is a schematic block diagram of a policy and charging rules function device according to another embodiment of the present invention.

A policy and charging rules function device 80 in FIG. 8 may be configured to implement steps and methods in the foregoing method embodiments. In this embodiment of FIG. 8, the policy and charging rules function device 80 includes a processor 804, a memory 805, and an interface 801. The processor 804 controls an operation of the device 80, and may be configured to process a signal. The processor 804 may be referred to as a CPU (Central Processing Unit). The memory 805 may include a read-only memory and a random access memory, and provide an instruction and data for the processor 804. A part of the memory 805 may further include a nonvolatile random access memory (NVRAM). A transmitter circuit 802 and a receiver circuit 803 may be coupled to the interface 801. Components of the policy and charging rules function device 80 are coupled together by using a bus system 809, and in addition to a data bus, the bus system 809 includes a power bus, a control bus, and a status signal bus. However, for clarity of description, various buses are marked as the bus system 809 in the figure.

Specifically, the memory 805 may store an instruction for enabling the processor 804 to perform the following operations: generating indication information, where the indication information includes a target QoS parameter, service information, or an identifier of a target bearer; and sending an identifier of a PCC rule and the indication information to a PCEF device, so that the PCEF device binds, to the target bearer according to the indication information, a data flow indicated by an identifier of the data flow in the PCC rule indicated by the identifier of the PCC rule.

In the method according to this embodiment of the present invention, when a QoS parameter of a dynamic PCC rule is changed, a PCRF device sends indication information and an identifier of the PCC rule to a PCEF device. Then, the PCEF device performs, according to the indication information, bearer binding of a data flow corresponding to the identifier of the PCC rule. In this way, a case in which a new bearer is added can be avoided, and system maintenance costs can be further decreased.

Optionally, in one embodiment, the memory 805 may further store an instruction for enabling the processor 804 to perform the following operation.

The identifier of the PCC rule includes an identifier of a predefined PCC rule.

Figure 9:
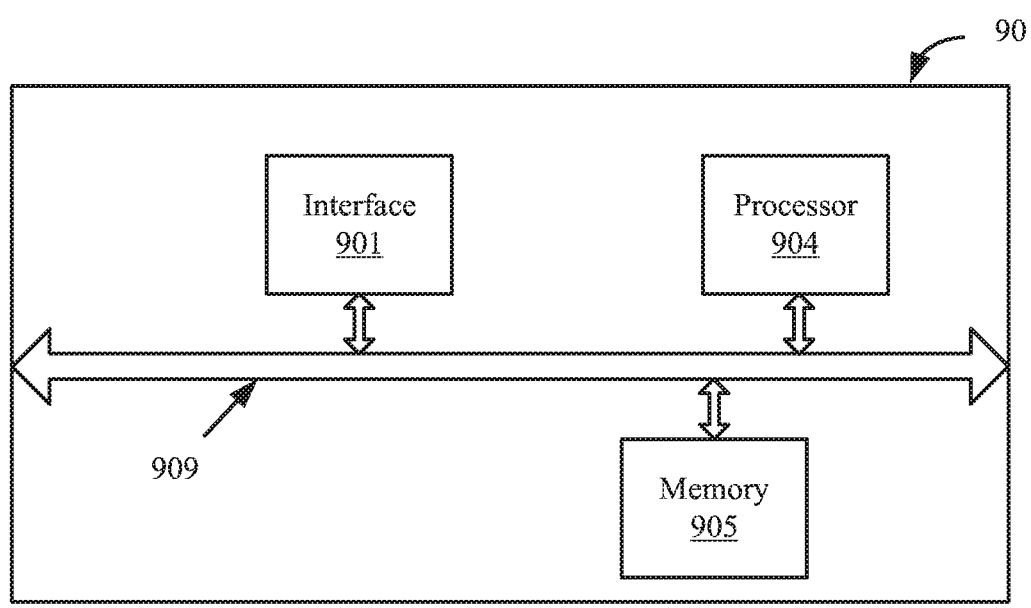
FIG. 9 is a schematic block diagram of a policy and charging enforcement function device according to another embodiment of the present invention.

FIG. 9 is a schematic block diagram of a policy and charging enforcement function device according to another embodiment of the present invention.

A policy and charging enforcement function device 90 in FIG. 9 may be configured to implement steps and methods in the foregoing method embodiments. In this embodiment of FIG. 9, the policy and charging enforcement function device 90 includes a processor 904, a memory 905, and an interface 901. The processor 904 controls an operation of the device 90, and may be configured to process a signal. The processor 904 may be referred to as a CPU (Central Processing Unit). The memory 905 may include a read-only memory and a random access memory, and provide an instruction and data for the processor 904. A part of the memory 905 may further include a nonvolatile random access memory (NVRAM). A transmitter circuit 902 and a receiver circuit 903 may be coupled to the interface 901. Components of the policy and charging enforcement function device 90 are coupled together by using a bus system 909, and in addition to a data bus, the bus system 909 includes a power bus, a control bus, and a status signal bus. However, for clarity of description, various buses are marked as the bus system 909 in the figure.

Specifically, the memory 905 may store an instruction for enabling the processor 904 to perform the following operations: receiving, from a PCRF device, indication information for changing a QoS parameter of a default bearer; and if there is a data flow corresponding to a predefined PCC rule in the default bearer before the QoS parameter of the default bearer is changed, binding the data flow corresponding to the predefined PCC rule to the default bearer.

In the method according to this embodiment of the present invention, when a QoS parameter of a default bearer is changed, a PCEF device still binds a data flow corresponding to a predefined PCC rule to the default bearer. In this way, a case in which a new bearer is added can be avoided, and system maintenance costs can be further decreased.

Optionally, in one embodiment, the memory 905 may further store an instruction for enabling the processor 904 to perform the following operation: when the data flow corresponding to the predefined PCC rule is bound to the default bearer and the PCEF device determines that a changed QoS parameter of the default bearer belongs to a specific QoS parameter range, binding the data flow corresponding to the predefined PCC rule to the default bearer.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present embodiments essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a universal serial bus (USB) flash drive, a removable hard disk, a read-only memory (ROM for short), a random access memory (RAM for short), a magnetic disk, or an optical disc.

The foregoing descriptions are merely specific embodiments of the present invention, but are not intended to limit the protection scope of the present embodiments. Any modification or replacement readily figured out by a person skilled in the art within the technical scope disclosed in the present embodiments shall fall within the protection scope of the present embodiments. Therefore, the protection scope of the present embodiments shall be subject to the protection scope of the claims.

What is claimed is:

1. A method comprising:
  receiving, by a policy and charging enforcement function (PCEF) device from a policy and charging rules function (PCRF) device, indication information and an identifier of a policy and charging control (PCC) rule;
  changing, by the PCEF device, a parameter in the PCC rule corresponding to the identifier of the PCC rule to a parameter in the indication information, to produce a changed PCC rule; and
  binding, by the PCEF device to a target bearer, according to the changed PCC rule and a data flow indicated by an identifier of the data flow in the PCC rule.

2. The method according to claim 1, wherein the indication information comprises a target quality of service (QoS) parameter, service information, or an identifier of the target bearer.

3. The method according to claim 2, wherein
  the parameter in the PCC rule comprises a QoS parameter in the PCC rule corresponding to the identifier of the PCC rule, and wherein the parameter in the indication information comprises the target QoS parameter in the indication information.

4. The method according to claim 2, wherein the parameter in the PCC rule comprises a QoS parameter in the PCC rule corresponding to the identifier of the PCC rule, and wherein the parameter in the indication information comprises a QoS parameter corresponding to the service information in the indication information.

5. A method comprising:
  receiving, by a policy and charging enforcement function (PCEF) device from a policy and charging rules function (PCRF) device, indication information and an identifier of a policy and charging control (PCC) rule; and
  binding, by the PCEF device to a target bearer, according to the indication information, a data flow indicated by an identifier of the data flow in the PCC rule, wherein the binding to the target bearer comprises:
  binding, by the PCEF device, the data flow indicated by the identifier of the data flow in the PCC rule, to the target bearer indicated by the identifier of the target bearer in the indication information.

6. The method according to claim 5, wherein the identifier of the target bearer comprises an identifier of a default bearer.

7. The method according to claim 5, wherein the indication information comprises a target quality of service (QoS) parameter, service information, or an identifier of the target bearer.

8. A policy and charging enforcement function (PCEF) device, comprising:
  a processor; and
  a non-transitory computer readable storage medium storing a program for execution by the processor, the program including instructions to:
    receive indication information and an identifier of a policy and charging control (PCC) rule from a policy and charging rules function (PCRF) device;
    change a parameter in the PCC rule corresponding to the identifier of the PCC rule to a parameter in the indication information, to produce a changed PCC rule; and
    bind, to a target bearer according to the changed PCC rule and a data flow indicated by an identifier of the data flow in the PCC rule.

9. The PCEF device according to claim 8, wherein the indication information comprises a target quality of service (QoS) parameter, service information, or an identifier of the target bearer.

10. The PCEF device according to claim 9, wherein the PCC rule comprises a QoS parameter in the PCC rule corresponding to the identifier of the PCC rule, and wherein the parameter in the indication information comprises the target QoS parameter in the indication information, to produce a changed PCC rule.

11. The PCEF device according to claim 9, wherein the parameter in the PCC rule comprises a QoS parameter in the PCC rule corresponding to the identifier of the PCC rule, and wherein the parameter in the indication information comprises a QoS parameter corresponding to the service information in the indication information.

12. A policy and charging enforcement function (PCEF) device, comprising:
a processor; and
a non-transitory computer readable storage medium storing a program for execution by the processor, the program including instructions to:
receive indication information and an identifier of a policy and charging control (PCC) rule from a policy and charging rules function (PCRF) device; and
bind, to a target bearer according to the indication information, a data flow indicated by an identifier of the data flow in the PCC rule, wherein the instructions to bind the target bearer further comprise instructions to bind the data flow indicated by the identifier of the data flow in the PCC rule, to the target bearer corresponding to the identifier of the target bearer in the indication information.

13. The PCEF device according to claim 12, wherein the identifier of the target bearer comprises an identifier of a default bearer.

14. The PCEF device according to claim 12, wherein the indication information comprises a target quality of service (QoS) parameter, service information, or an identifier of the target bearer.

* * * * *

UNITED STATES PATENT AND TRADEMARK OFFICE
CERTIFICATE OF CORRECTION

PATENT NO.         : 10,530,591 B2
APPLICATION NO.    : 15/593552
DATED              : January 7, 2020
INVENTOR(S)        : Wei Lu Page 1 of 1

It is certified that error appears in the above-identified patent and that said Letters Patent is hereby corrected as shown below:

In Column 17, Lines 5-6, Claim 10, delete "wherein the PCC rule comprises" and insert --wherein the parameter in the PCC rule comprises--.

Signed and Sealed this
Twenty-fifth Day of August, 2020

Andrei Iancu
*Director of the United States Patent and Trademark Office*